United States Patent
Mildner et al.

(10) Patent No.: US 9,610,983 B2
(45) Date of Patent: Apr. 4, 2017

(54) FLOOR STRUCTURE OF A MOTOR VEHICLE BODY WITH A LIGHTWEIGHT CONSTRUCTION

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/636,701

(22) Filed: Mar. 3, 2015

(65) Prior Publication Data
US 2015/0251705 A1 Sep. 10, 2015

(30) Foreign Application Priority Data
Mar. 4, 2014 (DE) .................... 20 2014 002 086 U

(51) Int. Cl.
*B62D 25/20* (2006.01)
*B62D 21/15* (2006.01)
(Continued)

(52) U.S. Cl.
CPC .......... *B62D 25/20* (2013.01); *B62D 21/157* (2013.01); *B62D 25/2036* (2013.01);
(Continued)

(58) Field of Classification Search
CPC .. B62D 25/20; B62D 25/2036; B62D 29/041; B62D 29/008; B62D 21/157; B62D 27/023
(Continued)

(56) References Cited

U.S. PATENT DOCUMENTS 2,314,603 A * 3/1943 Sorensen ............... B62D 21/06
280/794
2,476,664 A * 7/1949 Humig .................... B60G 9/02
267/286
(Continued)

FOREIGN PATENT DOCUMENTS

DE 19627610 A1 1/1998
DE 102005021166 A1 11/2006
(Continued)

OTHER PUBLICATIONS

German Patent Office, German Search Report for Country Application No. 202014002086.8, dated Dec. 4, 2014.
(Continued)

*Primary Examiner* — Jason S Morrow
*Assistant Examiner* — E Turner Hicks
(74) *Attorney, Agent, or Firm* — Lorenz & Kopf, LLP.

(57) ABSTRACT

A floor structure of a motor vehicle body is disclosed which respect includes a side skirt profile extending in the longitudinal direction of the vehicle (x) and a tunnel edge profile extending in the longitudinal direction of the vehicle, The tunnel profile is spaced apart from the side skirt profile in the transverse direction of the vehicle (y). Two side skirt profiles run essentially parallel along the outsides of the floor structure. The tunnel edge profile extends in approximately a concentric manner to the side skirt profiles. A transmission hump is provided in the middle of the floor structure and typically extends in the longitudinal direction of the vehicle is situated, fastened and/or reinforced thereon.

16 Claims, 5 Drawing Sheets

(51) Int. Cl.
*B62D 27/02* (2006.01)
*B62D 29/00* (2006.01)
*B62D 29/04* (2006.01)

(52) U.S. Cl.
CPC ......... *B62D 27/023* (2013.01); *B62D 29/008* (2013.01); *B62D 29/041* (2013.01)

(58) Field of Classification Search
USPC ..................... 296/187.08, 193.07, 204, 30
See application file for complete search history.

(56) References Cited

U.S. PATENT DOCUMENTS

| | | | | |
|---|---|---|---|---|
| 2,715,041 | A * | 8/1955 | Fierbaugh | B60G 99/002 267/228 |
| 2,844,864 | A * | 7/1958 | Schilberg | B62D 21/06 219/107 |
| 3,000,650 | A * | 9/1961 | Burrows | B62D 21/06 280/793 |
| 3,108,836 | A * | 10/1963 | Deckert | B62D 25/20 280/793 |
| 3,266,591 | A * | 8/1966 | Sampietro | B60F 3/0053 180/233 |
| 3,499,661 | A * | 3/1970 | Rowe, Jr. | B60R 19/285 105/6 |
| 4,941,680 | A * | 7/1990 | Baiker | B62D 21/18 280/785 |
| 7,469,957 | B1 * | 12/2008 | Boettcher | B62D 21/02 296/193.07 |
| 2001/0028179 | A1 | 10/2001 | Takemoto et al. | |
| 2004/0100126 | A1 | 5/2004 | Kawabe et al. | |
| 2005/0040676 | A1 * | 2/2005 | Kikuchi | B62D 29/048 296/193.07 |
| 2007/0187994 | A1 * | 8/2007 | Yasuhara | B62D 21/06 296/203.04 |
| 2008/0258503 | A1 | 10/2008 | Egawa et al. | |
| 2010/0052368 | A1 * | 3/2010 | Yamaguchi | B62D 25/2027 296/203.04 |
| 2012/0119545 | A1 * | 5/2012 | Mildner | B62D 25/2036 296/193.07 |
| 2013/0257097 | A1 * | 10/2013 | Kojo | B62D 25/2036 296/187.08 |
| 2016/0039467 | A1 * | 2/2016 | Takenaka | B62D 21/15 296/187.08 |

FOREIGN PATENT DOCUMENTS

| | | |
|---|---|---|
| DE | 102007021223 A1 | 11/2008 |
| JP | S62-13785 U | 9/1987 |
| JP | 2004216957 A1 | 8/2004 |
| JP | 2008068720 A | 3/2008 |
| JP | 2013103650 A * | 5/2013 |

OTHER PUBLICATIONS

Great Britain Patent Office, Great Britain Search Report for Great Britain Application No. 1502253.6, dated Jul. 14, 2015.

* cited by examiner

A-A

B-B

FLOOR STRUCTURE OF A MOTOR VEHICLE BODY WITH A LIGHTWEIGHT CONSTRUCTION

CROSS-REFERENCE TO RELATED APPLICATION

This application claims priority to German Patent Application No. 202014002086.8, filed Mar. 4, 2014, which is incorporated herein by reference in its entirety.

TECHNICAL FIELD

The present disclosure relates to a floor structure of a motor vehicle body, which is designed with a lightweight construction. In addition, the present disclosure also relates to a motor vehicle body provided with such a floor structure, as well as to a corresponding motor vehicle.

BACKGROUND

To reduce the energy and fuel consumption of vehicles, it is worthwhile to reduce the overall weight of the motor vehicle as much as possible. Therefore, it is also required in particular that the weight of the motor vehicle body be decreased, if possible without diminishing or while even improving its stiffness, strength and durability. DE 10 2005 021 166 A1 discloses a floor structure for a vehicle with at least two longitudinal chassis beams and a center support extending at least partially between the longitudinal chassis beams. The center support includes at least two cross beams, which extend from the center support to a respective rocker panel, and each exhibit a front and rear side.

SUMMARY

The present disclosure provides a weight-optimized floor structure of a motor vehicle body that can be manufactured in an especially streamlined and easy manner, and that also imparts an improved intrusion or penetration behavior to the motor vehicle body in the event of a side collision. Despite the minimized weight, the floor structure is to provide an improved passenger protection. This and other objects, desirable features and characteristics will become apparent from the subsequent summary and detailed description, and the appended claims, taken in conjunction with the accompanying drawings and this background.

The floor structure of a motor vehicle body provided in this respect includes at least one side skirt profile extending in the longitudinal direction of the vehicle (x) and at least one tunnel edge profile extending in the longitudinal direction of the vehicle, which is spaced apart from the side skirt profile in the transverse direction of the vehicle (y). The floor structure typically includes two side skirt profiles running essentially parallel along the outsides of the floor structure, between which the at least one tunnel edge profile extends in approximately a concentric manner.

Several, in particular two, tunnel edge profiles spaced apart from each other in the transverse direction of the vehicle can also be provided. A transmission hump provided in about the middle of the floor structure and typically extending in the longitudinal direction of the vehicle is situated, fastened and/or reinforced thereon.

The floor structure further includes at least one cross beam unit. The latter includes a cross beam extending between the side skirt profile and tunnel edge profile in a transverse direction of the vehicle (y), along with a floor plate joined with the cross beam. In particular, the cross beam unit includes the cross beam and floor plate joined therewith, and can be placed in the gap between the side skirt profile and tunnel edge profile as a preassembled or preconfigured module after the remaining floor structure has been put together.

The cross beam unit with its cross beam and preconfigured floor plate joined thereto acts as an insert that can at least sectionally be made out of a lightweight construction material, and thereby contribute to reducing the weight of the floor structure, and hence of the entire motor vehicle body. The cross beam unit is preconfigured, i.e., present in a preassembled or as-delivered state, and encompasses the cross beam and the floor plate fixedly or rigidly joined thereto.

When the cross beam unit is placed in the floor structure, i.e., in the gap formed between the side skirt profile and tunnel edge profile, an opening formed between the longitudinal profiles, meaning between the side skirt profile and tunnel edge profile, can be closed by the floor plate of the cross beam unit. In this respect, a separate floor panel can be advantageously omitted. Preconfiguring or preassembling the floor plate and cross beam eliminates the necessity of having to separately bond the cross beam structurally with a floor panel during or after its incorporation into the floor structure. To this extent, the production and assembly outlay can be reduced by providing the cross beam unit.

In another embodiment, at least one of the cross beams and floor plates is designed with a lightweight construction. This means that the cross beam and/or floor plate are made out of a lightweight construction material or include such a lightweight construction material. This makes it possible to reduce the weight by substituting lightweight construction materials for sheet steel components, thereby enabling a reduction in the weight of the floor structure, and hence of the entire motor vehicle.

At least one of the cross members and floor plates is typically fabricated out of a plastic material, a fiber-reinforced. plastic, or a lightweight metal. Possible plastic materials may include inexpensive plastics, such as polypropylene, but also the more temperature-resistant polyamide. Corresponding plastic materials can be fiber-reinforced, so as to impart a required level of stiffness and strength to the cross beam. It is further conceivable for the cross beam to be made out of a lightweight metal, for example aluminum or magnesium. The cross beam can here be fabricated as a cast metal component.

The cross beam and floor plate can further be made out of the same material. In order to fabricate the cross beam unit, the individual components, namely the cross beam and floor plate, can be joined together using suitable bonding techniques. In particular given a configuration involving a cast metal or plastic component, however, It would also be conceivable to provide the cross beam and floor plate with a one-piece design.

Using plastic materials, fiber-reinforced plastics, or lightweight metals not only enables a reduction in weight, but can rather also be advantageous with respect to production costs. This is because if the cross beam unit is fabricated out of a plastic material or fiber-reinforced plastic, the cross beam does not have to be painted to protect against corrosion. The cross beam unit can also be placed into the floor structure after a painting process. This further permits the use of especially cost-effective, but sufficiently stable and strong plastics, such as polypropylene, which under certain conditions does not exhibit a temperature resistance necessary for a painting and subsequent drying process.

In another embodiment, the cross beam abuts against facing side flanks of the side skirt profile and tunnel edge profile in the transverse direction of the vehicle. The cross beam in particular extends in the plane formed by the tunnel edge profile and side skirt profile, so that deformation forces introduced into the side skirts horizontally or in the transverse direction of the motor vehicle can be conveyed into the tunnel edge profile and dissipated via the cross beam.

In another embodiment, cross beam is joined with the side skirt profile and tunnel edge profile via adhesive bonding, bolting, riveting or clinching. Such joining processes are suitable in particular for joining the cross beam with the already painted longitudinal profiles, side skirt profile and tunnel edge profile. In this respect, joining the cross beam with the mentioned longitudinal profiles via adhesive bonding, bolting or clinching is advantageous for subsequently assembling the cross beam unit in the already painted floor structure.

Even when using a lightweight construction metal for the cross beam and/or floor plate, the problem of contact corrosion can be avoided, since adhesive bonding, bolting, riveting or clinching as the joining procedures do not damage the painted structure of the longitudinal profiles, as opposed to a welding process.

In another embodiment, at least sections of the cross beam exhibit a U-profile shaped cross sectional contour with reinforcing ribs. In particular, the cross beam is designed open at the bottom, and thus includes an essentially closed shell structure at the top. In this regard, the cross beam includes an essentially flat upper side, against which abut front and rear side flanks that typically extend in the vertical direction of the vehicle (z). The reinforcing ribs typically extend between the front and rear side flanks, specifically below the top side of the cross beam, i.e., inside the U-profile shaped cross sectional contour.

The reinforcing ribs can be rhomboid, hexagonal or otherwise in design, for example adjusted to the outer contour of the cross beam, In another embodiment, the cross beam includes four legs aligned like an X or cross relative to each other, whose free ends come to abut against the side skirt profile on the one hand, and against the tunnel edge profile on the other. The X or cross-shaped configuration of the cross beam makes it possible to form a comparatively large force application zone along the side skirt profile, or along the tunnel edge profile, in which the cross beam can absorb corresponding forces and divert them into adjoining components of the floor structure.

A respective two of the overall four legs are spaced apart from each other in the longitudinal direction of the vehicle, and adjoin the side skirt profile, while the other two ends of the leg are also spaced apart from each other in the longitudinal direction, and adjoin the tunnel edge profile or are supported against it.

In another embodiment, the cross beam is mirror symmetrical in design, at least relative to one of the central longitudinal axis and central transverse axis. When the cross beam is in a final assembly position on the floor structure, the central longitudinal axis extends roughly parallel to the longitudinal direction of the vehicle (x), while the central transverse axis extends roughly parallel to the transverse direction of the vehicle (y). The mirror symmetrical configuration of the cross beam relative to the central longitudinal axis and/or relative to the central transverse axis allows the cross beam to be installed both on the left and right side of the vehicle, so that the highest possible number of non-variable parts can be used in manufacturing the floor structure. The production and logistics outlay can be reduced as a result.

In another embodiment, at least sections of the cross beam are provided with at least one metal reinforcement for purposes of mechanical reinforcement. The metal reinforcement can here be embedded into the cross beam as a metal inlay, or also be fastened to the outside of the cross beam. In particular, the metal reinforcement is embedded or fastened on locations of the cross beam subjected to high loads; so as to offset any structural weaknesses on the cross beam, for example by using lightweight construction materials.

In another embodiment, the underside of the cross beam includes a flange section, which joins the cross beam with the floor plate. The flange section can be approximately continuous in design along the four legs aligned in the form of an X, so that the cross beam and floor plate can be joined over as large a surface as possible. Depending on the material selected for the cross beam and floor plate, the cross beam and floor plate can be joined together by material engagement, but also in some other way. For example, if the cross beam and floor plate are designed as plastic components, they can be welded together. However, other types of joining and bonding methods are also equally possible for this purpose to create the cross beam unit, such as adhesive bonding, bolting, riveting or clinching.

For example, the flange section of the cross beam can in the center of the cross beam envelop a recess in the cross beam profile, which can act as a passageway for additional vehicle components. For example, recesses aligned flush with each other can be provided on the underside of the cross beam to create a passageway for the foot well ventilation and/or cables.

In another embodiment, the preconfigured cross beam unit can be positioned between the side skirt profile and tunnel edge profile after the floor structure has gone through a painting process. Only after the floor structure has completed the painting process can it thus be joined with the side skirt profile and tunnel edge profile, for example via adhesive bonding, bolting, riveting or clinching, so that the already painted longitudinal profiles of the floor structure are not exposed to any damage to the paint. Even if the floor plate and/or cross beam are made out of a lightweight construction metal, the risk of contact corrosion can be avoided with the mentioned joining processes.

By providing the cross beam unit with a floor plate, the remaining floor structure can largely do without a floor panel. In other words, a free space or an opening between the tunnel edge profile and side skirt profile can only be sealed off by the floor plate of the cross beam unit with the insertion of the cross beam unit into the floor structure. To this extent, it is advantageous that a separate floor panel need not be assembled and provided.

Typically provided are two cross member units that are structurally identical or configured for the left and right motor vehicle sides. A left cross beam unit can be situated between the left side skirt profile and a left tunnel edge profile, while a correspondingly preconfigured right cross beam unit can be mounted between the right side skirt profile and right tunnel edge profile. The floor structure can exhibit two tunnel edge profiles running essentially parallel to each other, on which the transmission hump can be attached, or by means of which the transmission tunnel can be structurally reinforced. However, the two tunnel edge profiles can be replaced by a configuration with a single center support, whose opposing outsides are adjoined by both cross beam units.

Toward the front in the longitudinal direction of the vehicle, moving in the vehicle traveling direction, the side skirt profiles are structurally joined with the cowl of the motor vehicle. Toward the rear, opposite the traveling direction, both the side skirt profiles and the tunnel edge profiles are structurally joined with a heel plate that acts as a cross beam. Toward the front in the traveling direction, the tunnel edge profiles adjoin a front section of the transmission hump, which typically is additionally reinforced in this joining region by an engine or transmission bearer.

The front and rear structural attachment of the tunnel edge profile(s) to at the front transmission hump section and to the heel plate acting as the cross beam make it possible to take forces introduced into the body at approximately the height of the cross beam unit in the transverse direction of the vehicle and initially introduce them into the tunnel edge profile(s) by way of the cross beam, and further distribute them throughout the entire motor vehicle body, thus eliminating the need for continuous transverse structures in the area between the vehicle cowl and heel plate. Continuous transverse structures are here to be understood as cross beam structures that extend over approximately the entire vehicle width, i.e., from about the left side skirt profile to the right side skirt profile.

In addition, another embodiment provides a motor vehicle body exhibiting a floor structure described above.

Also provided is a motor vehicle, which includes such a motor vehicle body, and thus a floor structure described above.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 10:
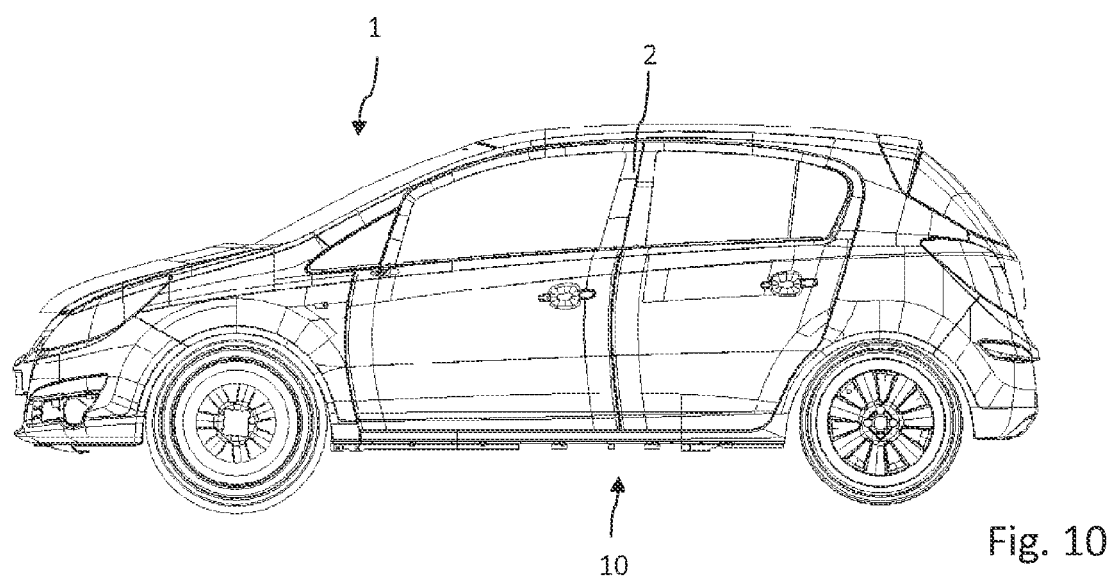
FIG. 10 shows a schematic view of a motor vehicle.

FIGS. 1, 2, 6 and 7 show the floor structure 10 of a motor vehicle body 2 of a motor vehicle 1 exemplarily depicted on FIG. 10. Toward the front in the traveling direction 3 of the motor vehicle 1, the floor structure 10 includes a cowl 11 that extends in roughly the vertical direction of the vehicle (z) and the transverse direction of the vehicle (v). The cowl 11 is enveloped from the side by lateral cowl plates 13, 14 or side walls. The cowl 11 adjoins a windowpane mount 12 for a windshield from above.

A front transmission hump section 15 extends opposite the traveling direction 3 in the middle of the cowl 11. The hat-shaped or U-profile shaped and downwardly open transmission hump section 15 is joined with two lateral tunnel edge profiles 20, 21 extending essentially in the longitudinal direction of the vehicle (x), which are structurally joined together on the rear side, i.e., facing away from the cowl 11, by means of a heel plate 16 acting as a cross beam.

The outer ends of the heel plate 16 are each structurally joined with another longitudinal profile, namely with an inner side skirt profile 22, 23, The side skirt profiles 22, 23 here extend roughly parallel to the tunnel edge profiles 20, 21. The side skirt profiles 22, 23 are joined with the lateral cowl plates 13, 14 toward the front in the traveling direction 3 of the motor vehicle 1. In addition, the front end sections of the side skirt profiles 22, 23 are structurally joined with the longitudinal chassis beams 17, 18 that also run in the longitudinal direction of the vehicle from the cowl 11 to the heel plate 16, as shown on FIG. 2.

Figure 8:
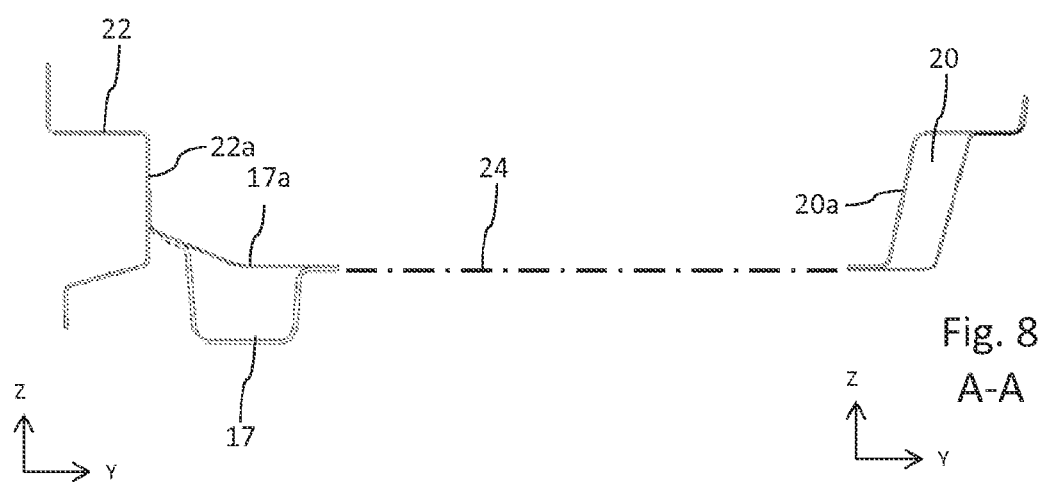
FIG. 8 is a cross section along A-A according to FIG. 1.

The area between the left side skirt profile 22 and left longitudinal chassis beam 17 is covered by a left lock plate 17a, as also evident from the cross section according to FIG. 8. The lock plate 17a closes inwardly toward the middle of the vehicle to form a seal with the left longitudinal chassis beam 17. The same also holds true with respect to the right longitudinal chassis beam 18 and right side skirt profile 23. The right longitudinal chassis beam 18 is also sealed off by a lock plate 18a tailored to the contour of the longitudinal chassis beam 18. An opening 24 is provided in the gap between the left side skirt profile 22 and left tunnel edge profile 20, as depicted on FIGS. 1, 2 and 8. In like manner, an opening 24 is formed between the right side skirt profile 23 and right tunnel edge profile 21, which extends in the longitudinal direction of the vehicle up until the heel plate 16, and which is bounded toward the front by a front floor panel section 19 or by a lower cowl section.

Figure 5:
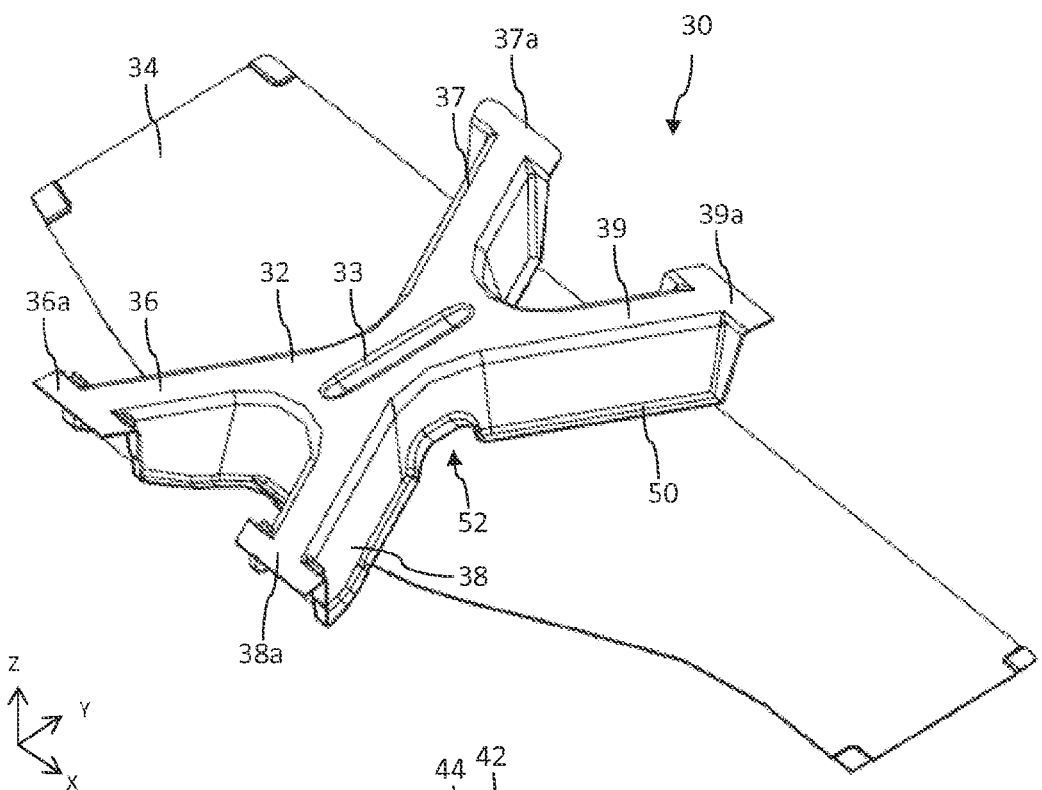
FIG. 5 shows a perspective view of the preconfigured cross beam unit.

The area of the body shell between the heel plate 16 and cowl 11 is free of continuous cross beam structures. As shown on FIG. 6, a respective left and right cross beam unit 30, 40 is provided to impart the necessary reinforcement and stiffening to the longitudinal profiles, meaning the tunnel edge profiles 20, 21 and side skirt profiles 22, 23. The left cross beam unit 30 shown by itself in a magnified view on FIG. 5 includes an essentially flat floor panel 34 and a cross beam 32. situated on the top side of the floor panel 34 and secured rigidly thereto. In the following description, reference will predominantly he made only to the left cross beam unit 30. However, the right cross beam unit 40 has a corresponding or similar design, so that the features shown and described for the left cross beam unit 30 apply equally to the right cross beam unit 40.

In particular, the cross beam unit 30, 40 is made out of a lightweight construction material. At least one of the cross beams 32, 42 and floor plates 34, 44 comprises a lightweight construction material. Possible lightweight construction materials include in particular plastic materials, fiber-reinforced plastics, but also lightweight construction metals, such as aluminum or magnesium. The cross beam unit 30, 40 represents a cross beam module, which can be preassembled or preconfigured with the floor panel mounted on the cross beam 32, 42 or rigidly arranged on the cross beam 32, 42 and incorporated as a whole into the floor structure 10 of the motor vehicle body 2.

Designing at least the cross beam 32, 42 and/or the floor plate 34, 44 out of a lightweight construction material enables a reduction in the weight of the floor structure 10, and thus of the entire motor vehicle body 2. Further, a continuous floor panel of a motor vehicle floor structure normally made out of sheet steel can be substituted by a floor plate of the cross beam unit designed with a lightweight construction.

In addition, the bond between the floor plate 34, 44 and cross beam 32, 42 makes it possible to simplify assembly. The preconfigured cross beam units 30, 40 along with the floor plate 34, 44 provided thereon are to be mounted on the already painted floor structure 10 of the motor vehicle body 2. Consequently, the floor plate 34, 44 is no longer to be joined with the cross beam 32, 42 separately during the final assembly of the motor vehicle. Such a joining process can already be performed by a motor vehicle supplier.

Figure 7:
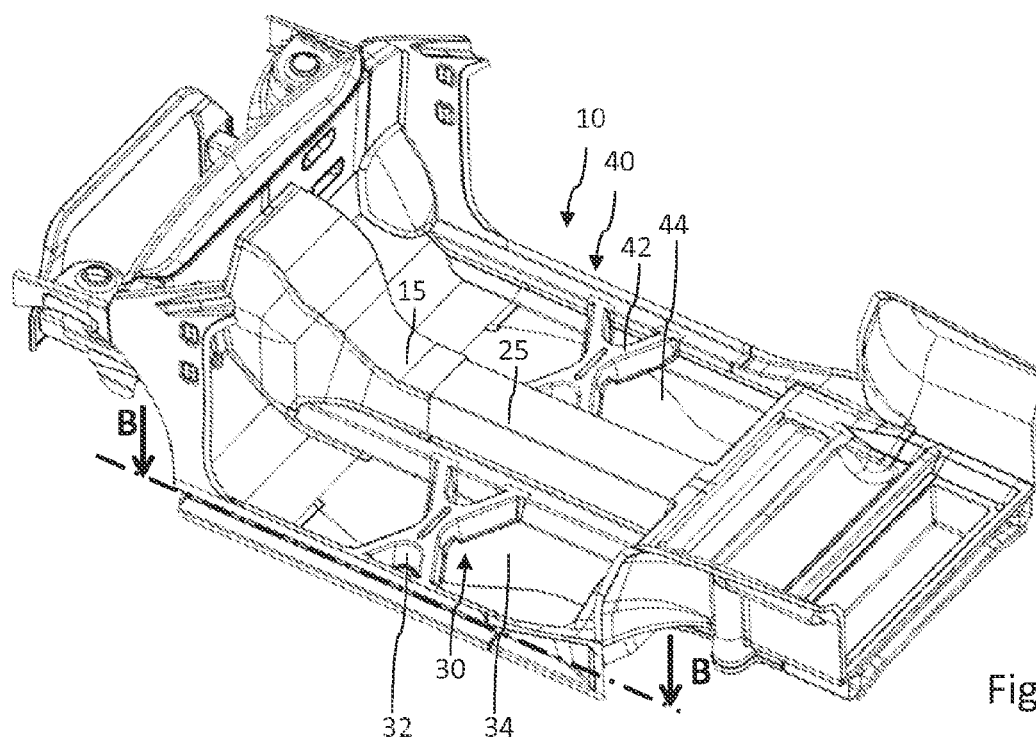
FIG. 7 shows the floor structure in final assembly configuration.
Figure 9:
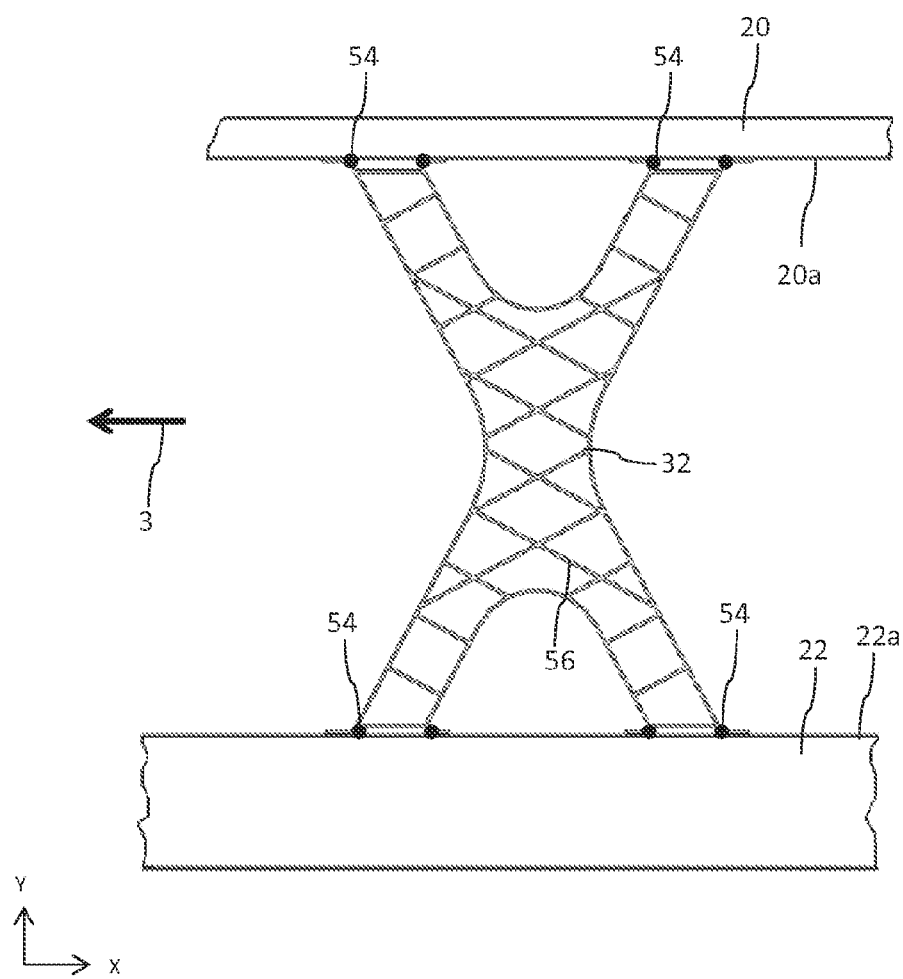
FIG. 9 shows a cross section along B-B according to FIGS. 7.

After or once a final installation position has been reached, for example as depicted on FIG. 7, the cross beam unit 30, 40 can be joined with the remaining floor structure 10, e.g., via adhesive bonding, bolting, riveting or clinching. As denoted on FIG. 9, for example, the opposing end sections of the cross beam 32 can be adhesively bonded with opposing side flanks 22a, 20a of the side skirt profile 22 and tunnel edge profile 20 in the area of individual joints 54.

The joint 54 is here used to represent various joining methods, for example to also include adhesive bonding, bolting, riveting or clinching. All of the mentioned joining methods for attaching the cross beam unit 30, 40 to the floor structure 10 share in common that they make it possible to attach the cross beam unit 30, 40 to the already painted floor structure 10 without any damage. Consequently, the cross beam unit 30, 40 need not be subjected to a painting and drying process, so that comparatively inexpensive plastics, such as polypropylene, can be used as the material for the cross beam unit, which might not exhibit the temperature resistance required for the painting and drying process.

Figure 1:
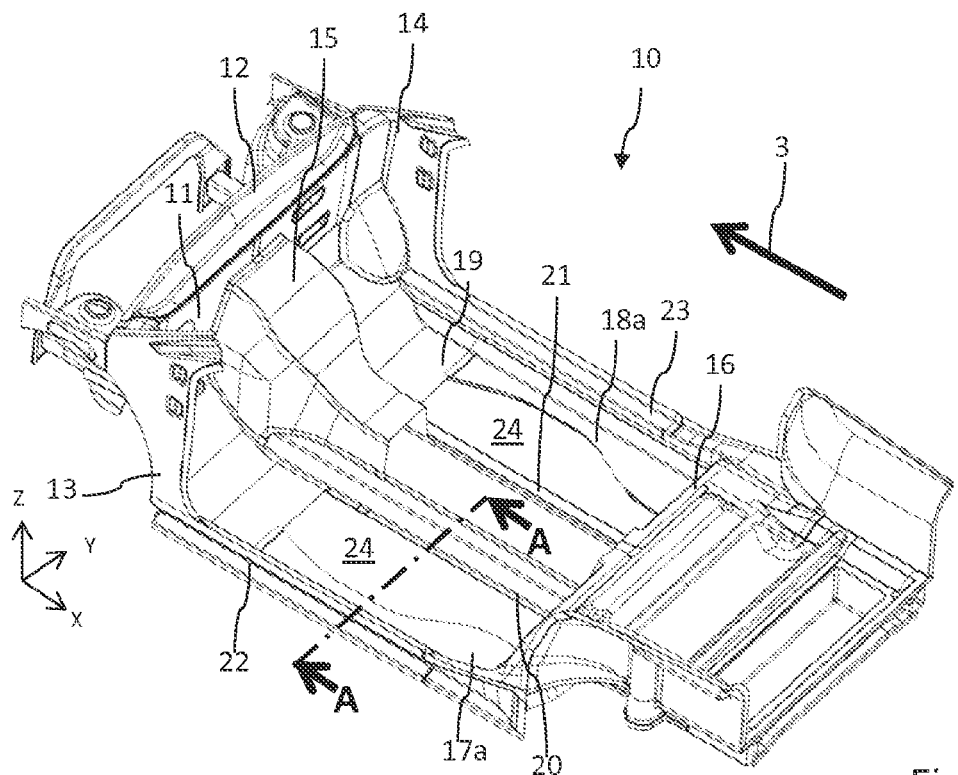
FIG. 1 shows a perspective view of the floor structure prior to assembly of the cross beam unit as seen at an inclination from above toward the back.
Figure 2:
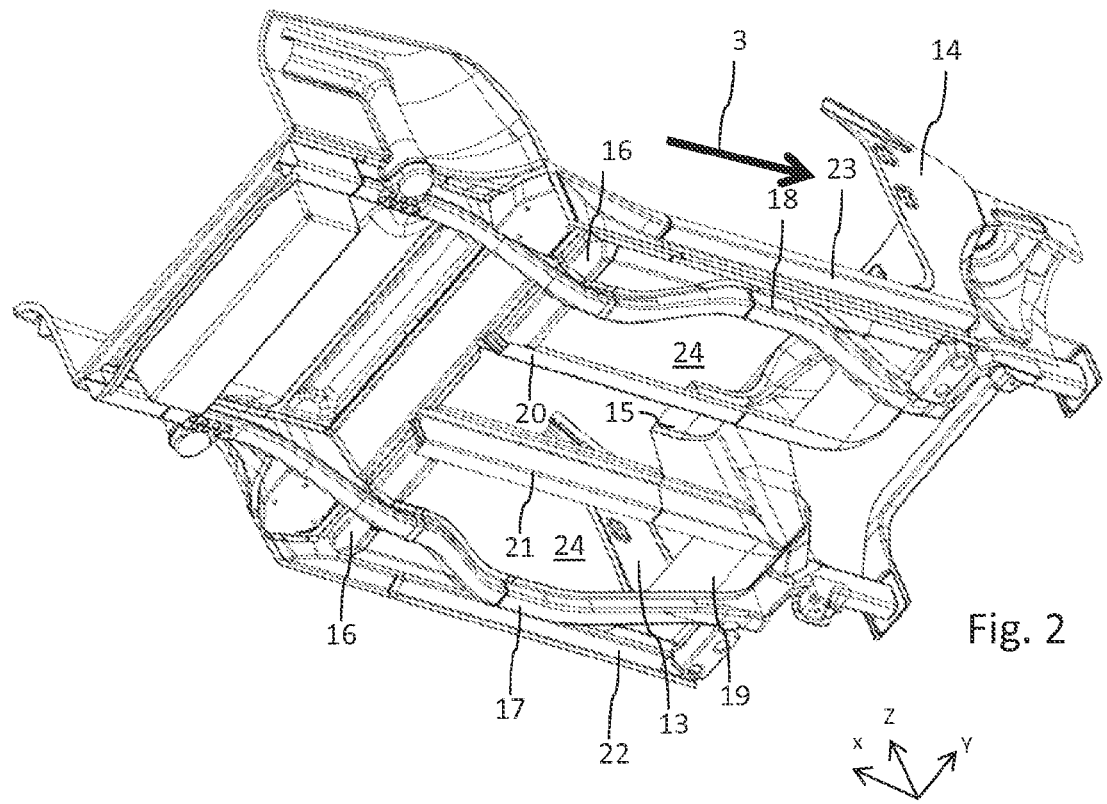
FIG. 2 shows the floor structure according to FIG. 1 as seen at an inclination from below.
Figure 3:
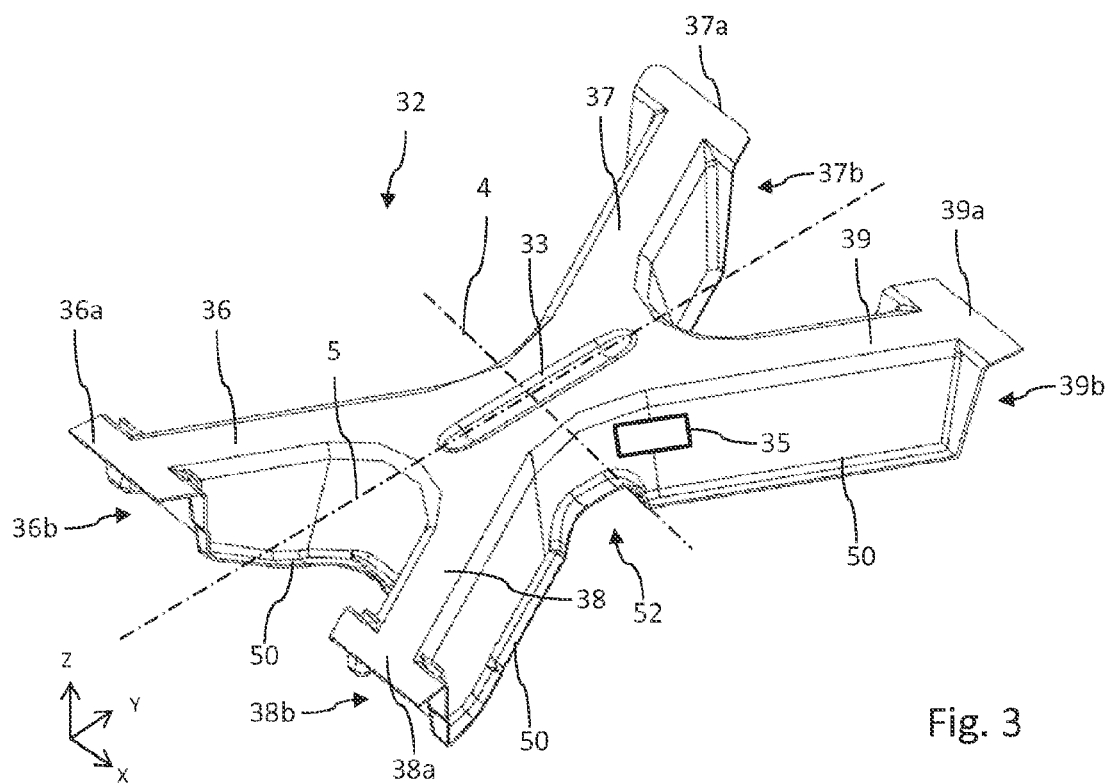
FIG. 3 shows an isolated perspective view of the cross beam from above.
Figure 4:
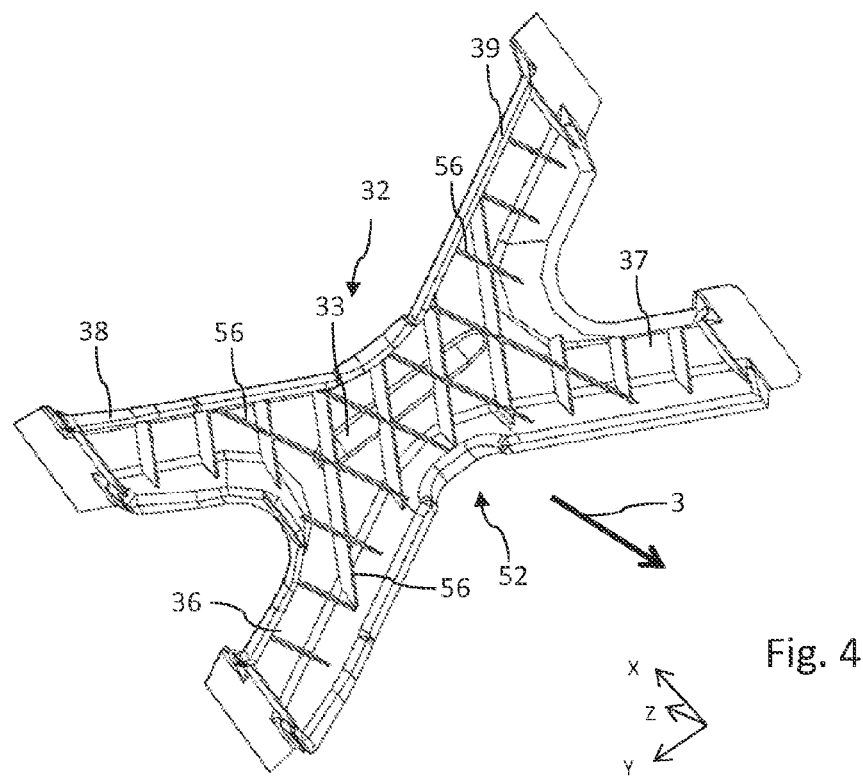
FIG. 4 shows the cross beam according to FIG. 3 as seen from below.

The cross beam 32 shown on its own on FIGS. 3 and 4 is designed in particular as a plastic or fiber-reinforced plastic component. It includes a total of four legs 36, 37, 38, 39 with an X-shaped or cross-shaped alignment relative to each other, whose free ends 36b, 37b, 38b, 39b come to abut against the side skirt profile 22 and tunnel edge profile 20 on the one hand, and there are also structurally joined with the corresponding longitudinal profiles, e.g., via adhesive bonding.

As shown on FIG. 3, the cross beam 32 is here designed mirror symmetrically relative to both a middle longitudinal axis 4 and relative to a middle transverse axis 5. In this way, one and the same cross member can be used as both a left cross beam 32 and a right cross beam 42. Only the floor plates 34, 44 of the cross beam units 30, 40 have to be adjusted based on the geometry of the respective opening 24 to be covered.

In particular if the cross beam 32 is designed as a plastic component, if necessary fiber-reinforced, nearly any one-piece geometries can be realized, such as the X-shaped or cross-shaped geometry depicted here. On the outside, meaning toward the top and toward the front as well as toward the rear, the cross beam 32 includes a shell-like, largely closed structure, as shown on FIG. 3. By contrast, the cross beam 32 is open or hollow in design toward the bottom, as depicted on FIG. 4. Reinforcing ribs 56 arranged in the form of hexagons or rhomboids extend between the front and rear side walls of the individual legs 36, 37, 38, 39, imparting an elevated strength and stiffness to the cross beam 32.

Formed on the underside of the cross beam 32 is a nearly continuous flange section 50, which protrudes roughly horizontally from the side walls of the cross beam 32, and in this regard extends parallel to the top side of the floor plate 34 to be joined with the cross beam 32. Provided in the middle of the cross beam 32 on the front side wall and on the rear side wall is a bulge or recess. The front and rear recesses are here situated flush relative to each other, so as to form a through hole 52, for example for passing through a ventilation system not explicitly depicted or for cables. Except for the through hole 52, the continuous flange section 50 serves to join the cross beam 32 with the floor plate 34 over nearly the entire surface. When configuring a plastic cross beam 32 and a plastic floor plate 34, a durable bond between the cross beam 32 and floor plate 34 can be formed in the area of the flange section, for example via friction welding.

In roughly the middle of its top side, the cross beam 32 further includes a beading 33, which also can improve the stiffness and strength of the cross beam 32.

The free ends 36b, 37b, 38b, 39b of the legs 36, 37, 38, 39 of the cross beam 32 are provided with outwardly projecting flange sections 36a, 37a, 38a, 39a, which are situated at the height of the top side of the cross beam 32 when in the final assembly position. The cross beam 32 can use these outwardly projecting upper flange sections 36a, 37a, 38a, 39a to abut itself against the top side of the respectively adjoining longitudinal profiles, tunnel edge profile 20 and side skirt profile 22 even in the vertical direction of the vehicle, and to this extent lie on the longitudinal profiles. In this way, the entire preassembled cross beam unit 3 along with integrated floor plate 34 can be placed in the gap formed by the side skirt profile 22 and tunnel edge profile 20 in an especially easy and production-efficient manner.

As denoted on FIG. 3, the cross beam 32 can also be partially or sectionally provided with metal reinforcements 35 for purposes of further reinforcement, for example which are secured to especially stressed locations of the cross beam 32 or, in particular when designing a plastic cross beam, be embedded into the plastic material, Given a cross beam 32 with a fiber-reinforced construction or a plastic cross beam 32 with a fiber-reinforced construction, the used fibers can be aligned based on the loading directions provided for the cross beam 32, so that the cross beam 32, 42 can exhibit an especially high mechanical stability and strength along prescribed directions. In particular, the cross beam can be designed as a plastic pressed component.

Figure 6:
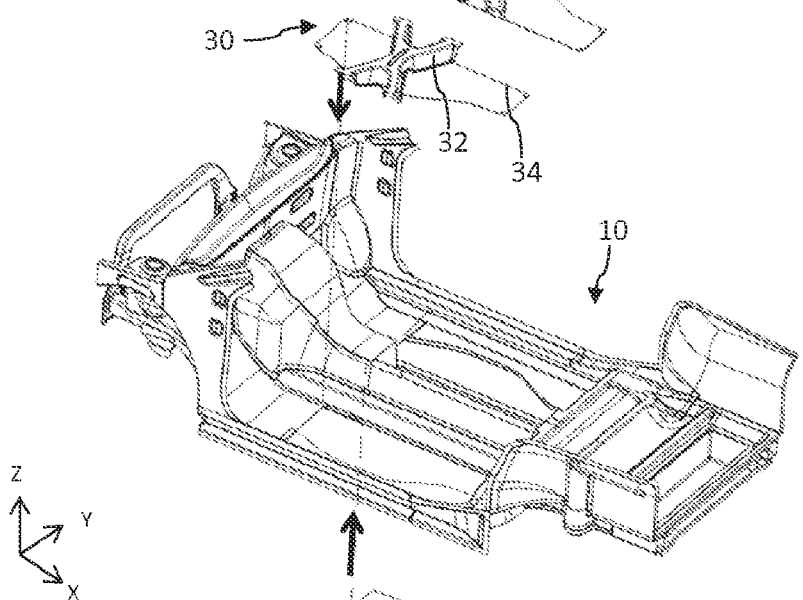
FIG. 6 shows a perspective view of the assembly of two cross beam units and a transmission hump on the floor structure.

After or during the assembly of the two cross beam units 30, 40, a rear transmission hump section 25 can further be mounted between the parallel running tunnel edge profiles 20, 21, as depicted on FIG. 6. In particular, the rear transmission hump section can be designed like a preassembled or preconfigured transmission hump module, on which additional units or motor vehicle components can already be preassembled, for example the battery, hand brake, etc.

It should be further noted that seat rails for attaching motor vehicle seats can be situated on the tunnel edge profiles 20, 21 and side skirt profiles 22, 23.

Providing the cross beam unit 30, 40 in a lightweight construction makes it possible to shift the production and assembly of floor modules to the final vehicle assembly stage, i.e., to after the car body shell has gone through the painting process. Using plastic or light metal components further leads to a reduction in weight. Designing the cross beam 32, 42 as a plastic component also permits a reduction in toot and material costs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A floor structure for a motor vehicle body comprising:
    at least one side skirt profile extending in a longitudinal vehicle direction;
    at least one tunnel edge profile extending in the longitudinal vehicle direction and spaced apart from the side skirt profile in a transverse vehicle direction; and
    at least one cross beam unit having a cross beam extending between the side skirt profile and the tunnel edge profile in the transverse vehicle direction, and a floor plate joined with the cross beam, wherein the cross beam has a longitudinal axis that extends in the longitudinal vehicle direction, wherein the cross beam has a transverse axis that extends in the transverse vehicle direction, and wherein the cross beam is symmetrical with respect to the longitudinal axis and the transverse axis;
    wherein the cross beam comprises four legs aligned in a cross relative to each other, each leg having a free end abutting against one of the side skirt profile and the tunnel edge profile.

2. The floor structure according to claim 1, wherein at least one of the cross beam and the floor plate is fabricated from one of a plastic material, a fiber-reinforced plastic and lightweight metal.

3. The floor structure according to claim 1, wherein the cross beam abuts against facing side flanks formed on the side skirt profile and the tunnel edge profile in the transverse vehicle direction.

4. The floor structure according to claim 1, wherein the cross beam is joined with the side skirt profile and the tunnel edge profile with one of adhesive bonding, bolting, riveting and clinching.

5. The floor structure according to claim 1, wherein at least a portion of the cross beam comprises a U-profile shaped cross sectional contour with reinforcing ribs.

6. The floor structure according to claim 1, wherein the cross beam includes a top side that faces away from the floor plate and a terminal end that is attached to one of the side skirt and the tunnel edge, the terminal end including at least one outwardly projecting flange section, the flange section being disposed at a height of the top side of the cross beam.

7. The floor structure according to claim 1, wherein at least a portion of the cross beam comprises at least one metal reinforcement for providing mechanical reinforcement.

8. The floor structure according to claim 1, wherein an underside of the cross beam comprises a flange section joining the cross beam with the floor plate.

9. The floor structure according to claim 1, wherein the cross beam unit is pre-painted and preconfigured by joining the floor plate and cross beam, the pre-painted cross beam unit being positioned between and joined to the side skirt profile and tunnel edge profile.

10. The floor structure according to claim 1, wherein the side skirt profile and tunnel edge profile define an opening sealed by the floor plate of the cross beam unit formed therebetween.

11. A motor vehicle body comprising a floor structure according to claim 1.

12. A motor vehicle comprising a motor vehicle body having a floor structure according to claim 1.

13. A floor structure for a motor vehicle body comprising:
    a side skirt profile extending in a longitudinal vehicle direction and having a first flank;
    a tunnel edge profile extending in the longitudinal vehicle direction and spaced apart from the side skirt profile in a transverse vehicle direction and defining an opening therebetween, the tunnel edge profile having a second flank facing the first flank; and
    at least one cross beam unit having a floor plate and a cross beam having a first flange section joined to the floor plate, a second flange section abutting the first flank and a third flange section abutting the second flank such that the cross beam extends between the side skirt profile and the tunnel edge profile in the transverse vehicle direction, wherein the cross beam unit seals the opening defined between the side skirt profile and the tunnel edge profile, wherein the cross beam has a longitudinal axis that extends in the longitudinal vehicle direction and a transverse axis that extends in the transverse vehicle direction, and wherein the cross beam is symmetrical with respect to the longitudinal axis and the transverse axis;
    wherein the cross beam comprises four legs aligned in a cross relative to each other, each leg having a free end abutting against one of the side skirt profile and the tunnel edge profile.

14. The floor structure of claim 13 wherein at least a portion of the cross beam comprises a U-profile shaped cross sectional contour with reinforcing ribs.

15. The floor structure of claim 13 wherein the cross beam is a unitary, one-piece member.

16. The floor structure of claim 13 wherein at least a portion of the cross beam comprises a metal reinforcement for providing mechanical reinforcement.

* * * * *